Sept. 15, 1936.  J. McHENRY  2,054,294
EGG CANDLING DEVICE
Original Filed June 28, 1934   3 Sheets—Sheet 1
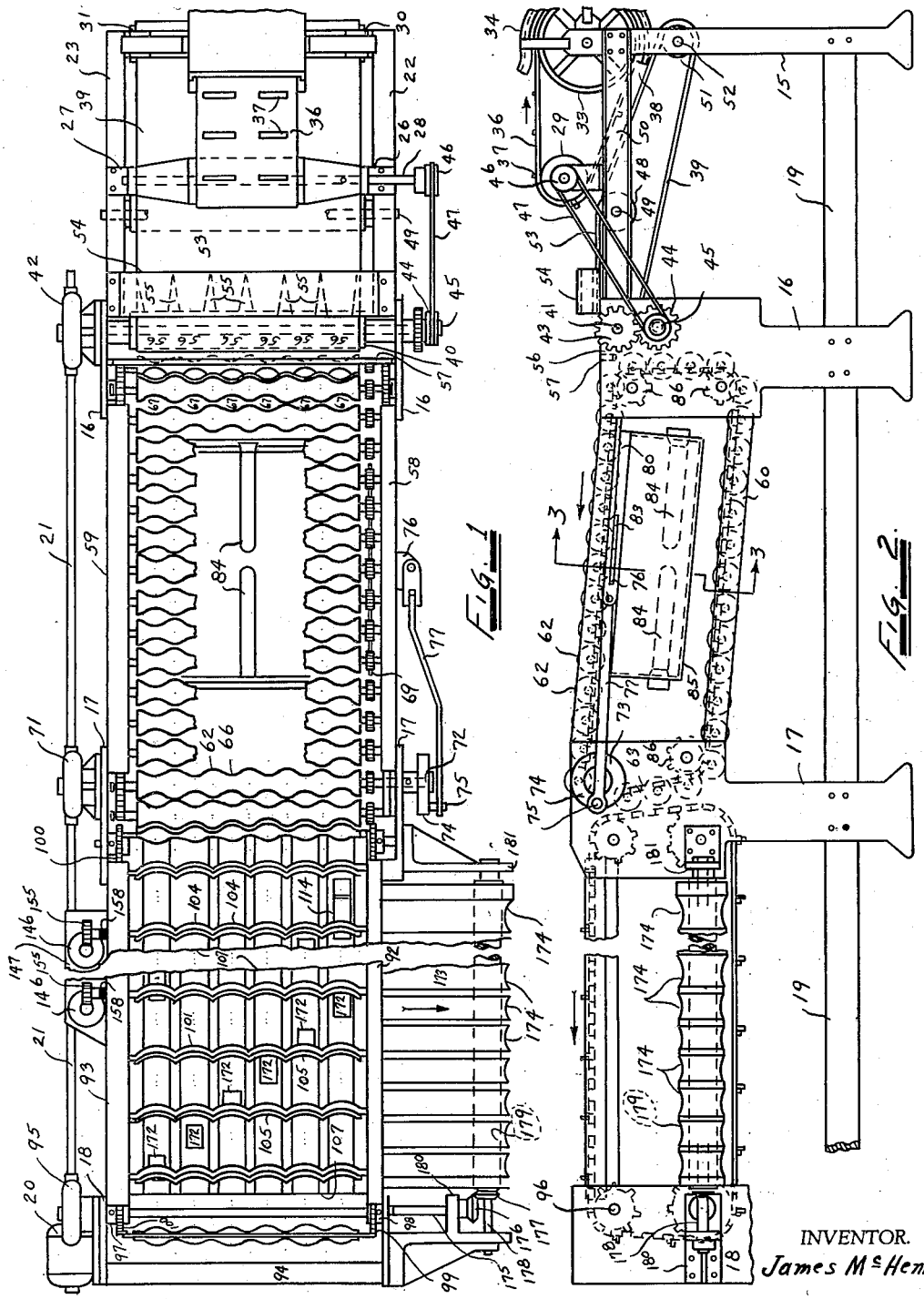
INVENTOR.
James McHenry
BY Edward M. Apple
ATTORNEY.

Sept. 15, 1936.　　　　J. McHENRY　　　　2,054,294
EGG CANDLING DEVICE
Original Filed June 28, 1934　　3 Sheets-Sheet 2
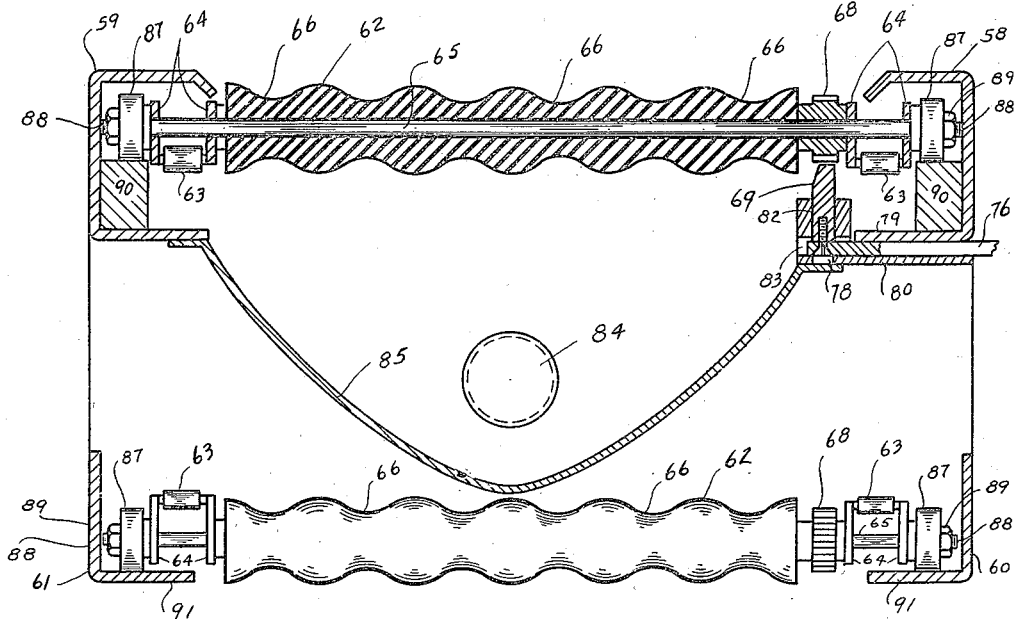
FIG. 3
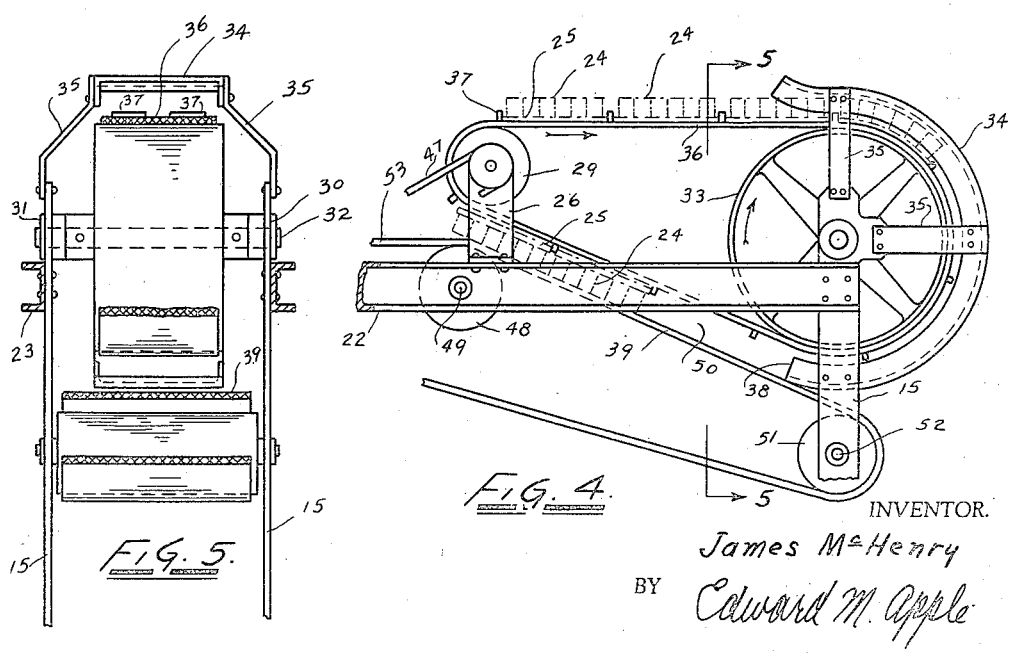
FIG. 4.
FIG. 5.
INVENTOR.
James McHenry
BY Edward M. Apple
ATTORNEY.

Sept. 15, 1936.                    J. McHENRY                    2,054,294
                                EGG CANDLING DEVICE
                    Original Filed June 28, 1934    3 Sheets-Sheet 3
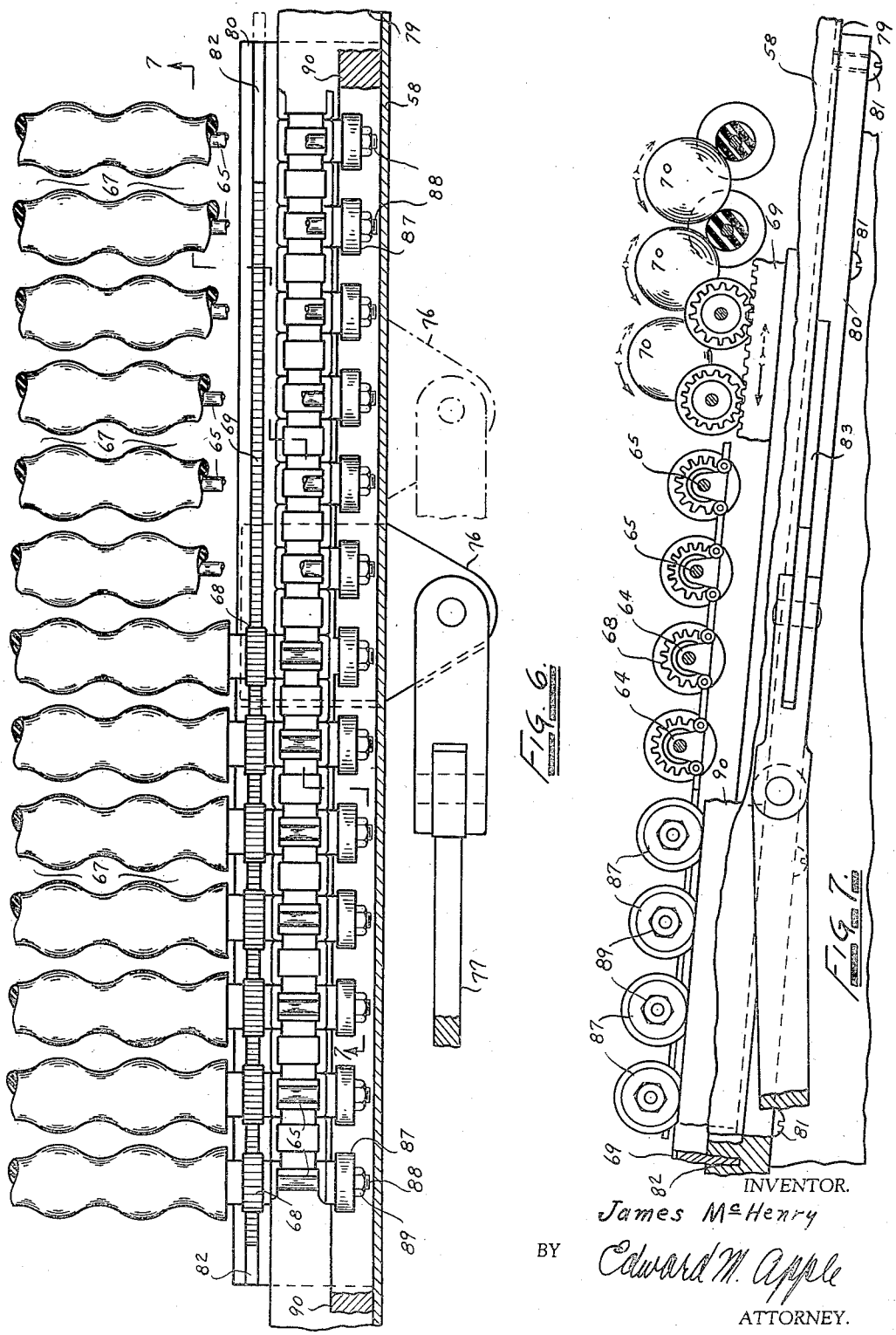
INVENTOR.
James McHenry
BY  Edward M. Apple
                ATTORNEY.

Patented Sept. 15, 1936

2,054,294

UNITED STATES PATENT OFFICE 2,054,294

EGG CANDLING DEVICE

James McHenry, Detroit, Mich., assignor of one-half to The Eastern Market Cold Storage Company, Detroit, Mich., a corporation of Michigan Original application June 28, 1934, Serial No. 732,803. Divided and this application July 20, 1935, Serial No. 32,393

4 Claims. (Cl. 88—14.8)

This invention is a division of my application Serial Number 732,803, filed June 28, 1934 which issued into United States Letters Patent No. 2,020,511, November 12, 1935, and relates to machines for testing and grading eggs and particularly to that type of machine wherein the eggs are moved over a source of light by means of an endless conveyor and graded as to size by determination of weight.

An object of the invention is the provision of an improved egg candling and grading machine which is designed to overcome many of the operating objections inherent in present known devices of this kind.

Another object of the invention is the provision of a device of the character referred to wherein the forward and reverse rotation of the egg carrying elements is made automatic and positive thereby eliminating any tendency for the eggs to become jammed between a rotating and non-rotating element.

Another object of the invention is the provision of an egg testing machine which will have greater efficiency and be more economical to operate than devices of this character heretofore known.

The foregoing objects and other advantages of the invention will become more apparent as the description proceeds, reference being made from time to time to the drawings forming part of the disclosure, in which drawings:

Fig. 1 is a plan view of a machine embodying my invention.

Fig. 2 is a side elevation of the machine shown in Fig. 1.

Fig. 3 is an enlarged vertical section taken on line 3—3 of Fig. 2.

Fig. 4 is an enlarged side elevational view of the loading mechanism of my device.

Fig. 5 is an enlarged vertical sectional view taken along line 5—5 of Fig. 4.

Fig. 6 is an enlarged fragmentary plan view showing the rotating and reciprocating mechanism of the egg candling sub-unit of the machine illustrated in Fig. 1.

Fig. 7 is a vertical sectional view taken along lines 7—7 of Fig. 6.

Referring now, with more particularity, to the drawings it will be seen that the working elements of the machine are carried and supported by a suitable structural frame consisting of pairs of upright side members 15, 16, 17 and 18 and longitudinal brace members 19 which are preferably secured to the aforementioned upright side members by rivets or other suitable means.

Upon one of the side members 18 is mounted a self contained motor and reduction gear 20, to which is connected a line shaft 21 which extends longitudinally along one side of the machine proper and supplies the motive power to the various elements hereinafter described. The pairs of upright side members 15 and 16 are further connected to each other by means of longitudinally extending channel irons 22 and 23 which completes the frame for the loading mechanism which is designed to remove the eggs from cartons 24, (Fig. 4), and feed them to the candling and weighing units hereinafter described. It is the commercial practice to pack six eggs in a row each way in a carton which explains the reason for my device having six longitudinal runways and six curvatures on each conveyor.

Egg cartons normally have deep nests in which the eggs are carried and the nests rest upon a heavy base member 25 which cannot easily be removed from under a carton, therefore a complete turnover has to be effected in order to quickly remove the eggs from the cartons and place them on the conveying belt 26, as is illustrated in Fig. 4. This is accomplished in the following manner: On top of the horizontal channel members 22 and 23, are mounted brackets 26 and 27, which provide the bearings for a drive shaft 28 upon which is fixedly placed a suitable roller 29. Near the top of the upright side members 15 bearings 30 and 31 are provided to receive the shaft 32 upon which is also fixedly mounted a pulley 33 which is of sufficient diameter to allow an egg carton to travel along its outside periphery without bending the carton. Surrounding the pulley 33 is a curved guard member 34, having inturned edges, which forms an inverted U-shaped channel through which the cartons pass. The guard 34 is held in place by brackets 35 which are secured to members 15. A conveyor belt 36 extends tightly over the roller 29 and pulley 33 and travels in the direction indicated by an arrow. The outside periphery of said belt is divided into equal spaces by strips of rubber 37, which are securely fastened thereto, by any suitable means, leaving sufficient space between the strips to receive a carton of eggs, as illustrated in Fig. 4. The strips 37 provide a positive drive for the cartons and no slippage along the path of travel is possible. The cartons, after making a 180 degree turn, will emerge from the guard 34, at point 38, with the base 25 resting on top and thus will pass on to a secondary conveyor belt 39, (Fig. 4)

which travels at the same relative speed as the conveyor belt 36. Belt 39 is driven by a roller 40, which is fixed to a drive shaft 41, which has its bearings in the upper end of members 16. The shaft 41 communicates with the drive shaft 21, through suitable gears contained in gear box 42, from which it receives its motive power. To the opposite end of shaft 41 is keyed a gear 43 which meshes with a combination gear and pulley 44, which in turn rotates upon an idler stud 45, which is securely fastened to member 16. A second pulley 46 is disposed in line with pulley 44, which is keyed to the end of the shaft 28. A drive belt 47 travels over the last named pulleys and supplies the operating power for the egg feeding unit. An idling roller 48, fastened to the shaft 49, which is journaled in members 22 and 23, is suitably located so as to produce a break in the direction of travel of the conveyor belt 39, and assures a parallel passage, as indicated at 50, between the upper and lower conveyor belts 36 and 39. Roller 51 moves freely upon shaft 52 which extends between the upright frame members 15 and aids to support the conveyor belt 39. All of the aforementioned members so arranged will co-operate to transport the complete carton of eggs to the horizontal table-like portion 53 of the conveyor belt 39, where the carton 24 and the base 25 may easily be removed, leaving the eggs free to travel under the dividing bridge 54 toward the candling unit. The member 54 consists of a strip of sheet metal which is formed with off-sets at each end to elevate it from the portion 53 of the conveyor 39 and is securely riveted to the frame members 22 and 23 respectively. Secured to the underside of bridge 54 is a plurality of wedge-shaped rubber partitions 55, adapted to direct the individual eggs into the proper channels for candling and inspection.

In order to retard the momentum of the falling eggs, when passing from the portion 53, of the conveyor belt 39, at point 56, a shock-absorbing rubber band 57 is stretched between the members 16 and 16 (Fig. 1).

The elements constituting the sub-unit intended for candling the eggs are supported by the upright side members 16 and 17 and the channel members 58 and 59, and the side rails 60 and 61, which are secured to one another by welding or other suitable means.

The egg conveying system of the candling unit, consists of a continuous link-belt arrangement 63, having a plurality of rollers 62 fastened there, by means of protruding lugs 64 as illustrated in Fig. 3. The rollers 62 are preferably made of soft rubber cast around a steel shaft 65. Each of the rubber rollers 62 is provided with six concave surfaces 66, which produce between themselves, cradle like openings 67 in which the eggs are supported and held apart so as to expose a considerable portion of the eggs to a light source. Disposed at one end of each roller 62 is a pinion 68 which is press-fitted onto the rod 65. Each pinion is adapted to mesh during part of its longitudinal travel, with a rack 69 which is slidably supported by the side rail 58. As the pinions mesh with the rack 69 a positive rotation is imparted to the rollers 62 and to the eggs 70, which are supported by such rollers, and when the rack 69 is moved longitudinally, as will be explained hereinafter, a positive reverse rotation is imparted to the rollers 62 and to the eggs 70.

The action just described makes possible a thorough inspection of the eggs and obviates the difficulty, often encountered in machines of this character, of having the eggs caught and broken or checked between rotating roller and one which fails to rotate because of one reason or another.

The complete link-belt conveyor 63 receives its motive power through a worm gear reduction drive, encased in gear-box 71, which is coupled to the main drive shaft 21 and to the drive shaft 72 which is journaled in the upright side members 17 and upon which are fixedly mounted suitable driving sprockets 73 adapted to engage the link-belt members 63 causing them to move in the direction indicated by an arrow, (Fig. 2).

Upon the free end of the shaft 72 is keyed an eccentric plate 74 to which is secured a stud 75 adapted to impart a reciprocable motion to the push and pull plate 76, through a conventional connecting rod 77. The plate 76 in turn is secured to the rack 69 by means of screws 78 (Fig. 3). A guide block 80 is secured to the underside of the side rail 58 by means of screws 81, said guide block 80 being formed with a longitudinal slot 82 adapted to engage the rack 69 and guide said rack. The guide block 80 is provided with a transverse slot 83 adapted to engage the push and pull plate 76. The rotation of the eggs 70 begins immediately upon the engagement of pinions 68 with rack 69 and ceases after their disengagement.

Positioned below the upper course of rollers 62 of the link-belt conveyor 63, is a light source 84, consisting preferably of one or more tubular bulbs supported longitudinally in a reflector 85, which is secured at one side to the member 59 and at the other side to the guide block 80, in such manner that the light rays are directed through the openings 67.

After the rollers 62, constituting the conveyor 63, have passed over the light source 84 and the riciprocating rack 69, the rollers 62 cease to rotate and the conveyor passes the eggs on to the succeeding sub-unit.

In order to help support the conveyor 63 and maintain its alignment, a series of idling shafts and sprockets are provided as indicated at 86, the latter having their bearings in the upright side members 16 and 17 respectively. In order to further support the weight of the conveyor 63 and eliminate considerable friction of the moving parts, a steel roller 87 is rotatably mounted on each end of each respective shaft 65, and held in place by the threaded ends 88 of shaft 65 and nut 89. The rollers 87 are adapted to engage the rails 90 which are placed along the inside of channel members 58 and 59 respectively. The returning or slack portion of the conveyor 63 is supported by the horizontal flanges 91 of the angle-iron frame members 60 and 61.

After the eggs are candled and inspected they are transported to the weighing and grading sub-unit of the machine which is fully disclosed in my co-pending application hereinabove referred to.

Having described my invention, what I claim and desire to secure by Letters Patent is:

1. In a device of the character described the combination of a frame, shafts journaled in said frame, sprockets on said shafts, endless link belts arranged to travel over said sprockets, said endless link belts having a plurality of resilient rollers rotatably mounted thereto, each of said rollers having a pinion secured thereto, a rack slidably supported by said frame and arranged to engage said pinions, a push-pull plate secured to said rack, a connecting rod movably secured at one end to said plate and at the other end to an eccentric positioned on one of said shafts, and means for driving said endless link belts and said eccentric.

2. In a device of the character described the combination of a frame, shafts journaled in said frame, sprockets on said shafts, endless link belts arranged to travel over said sprockets, a plurality of lugs secured to said link belts, shafts journaled in said lugs, each of said shafts supporting a fixedly mounted resilient roller, a pinion secured to each of said last named shafts, said pinions being arranged to mesh intermittently with a reciprocable rack mounted on said frame, means for driving said link belts, means for reciprocating said rack and means for causing rays of light to be cast between the said resilient rollers from below, while said rollers are in the vicinity of said rack.

3. In a device of the character described the combination of a frame, including upper and lower longitudinally disposed track members, a source of light positioned between said upper and lower tracks, shafts, including at least one drive shaft, journaled in said frame, sprockets on said shafts, endless link belts arranged to travel over said sprockets, a plurality of lugs secured to said link belts, a plurality of small shafts journaled in said lugs, resilient rollers fixed to said last named shafts, a comparatively small wheel freely mounted at each end of each of said small shafts, said wheels being arranged to travel on said track members to help support said endless link belts and said rollers, a pinion secured to each of said rollers, a reciprocating rack supported by said frame and arranged to engage said pinions, a push-pull plate secured to said rack, a connecting rod, movably secured at one end to said plate and at the other end to an eccentric fixed to said drive shafts, and means for motivating said drive shaft.

4. In a device of the character described, the combination of a frame, including upper and lower track members, a cradle like reflecting element positioned between said track members, a light source positioned within and supported by said reflecting element, shafts journaled in said frame, an endless link belt arranged to travel over said shafts and said track members, a plurality of resilient rollers journalled in said link belt, pinions on said rollers, a rack slidably mounted on said frame and arranged to engage said pinions as the rollers pass over said light source, and means for reciprocating said rack, said means comprising a push-pull plate secured to said rack and a connecting rod pivoted to said plate and to a driving eccentric.

JAMES McHENRY.